United States Patent Office 2,989,672
Patented June 20, 1961

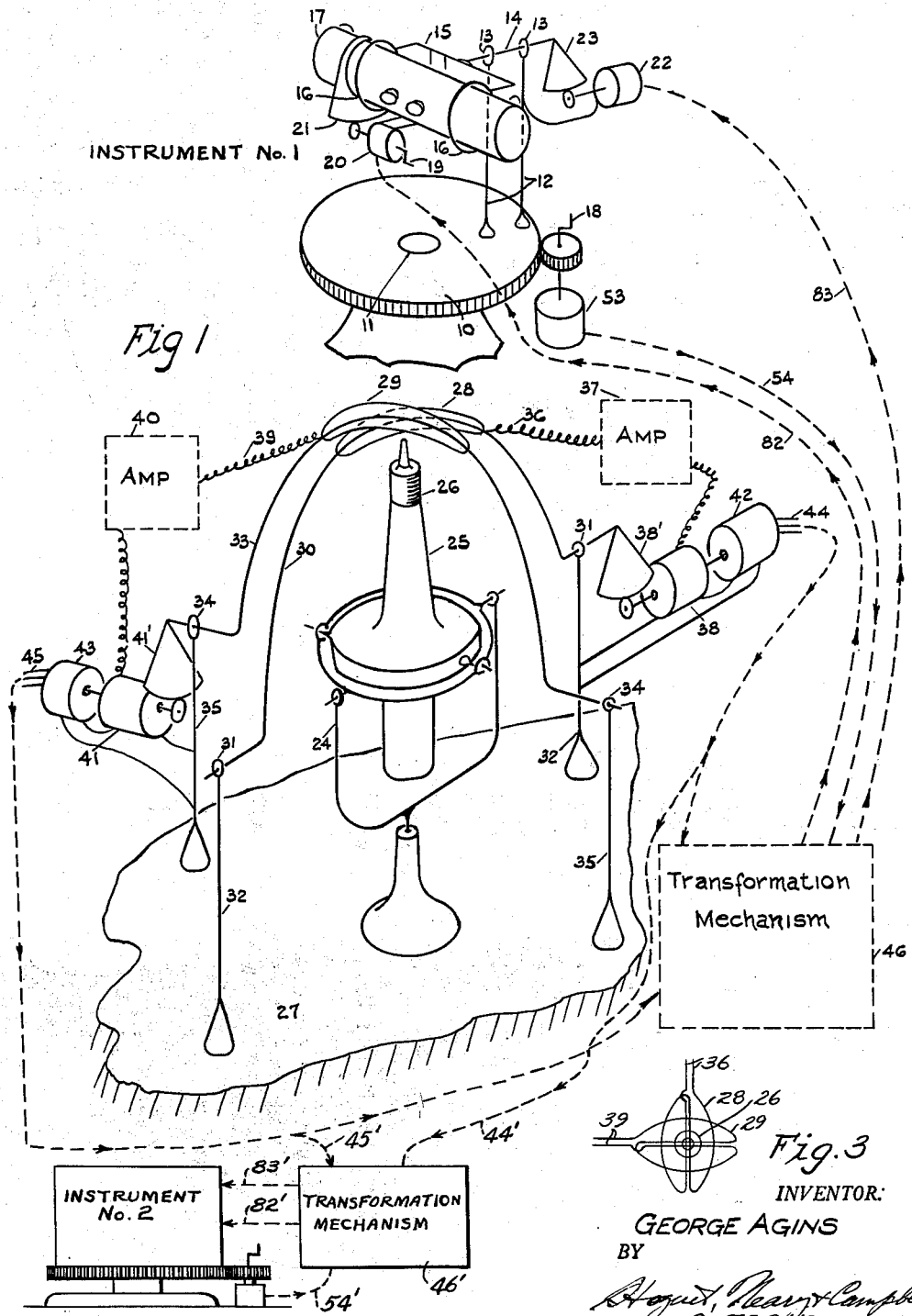

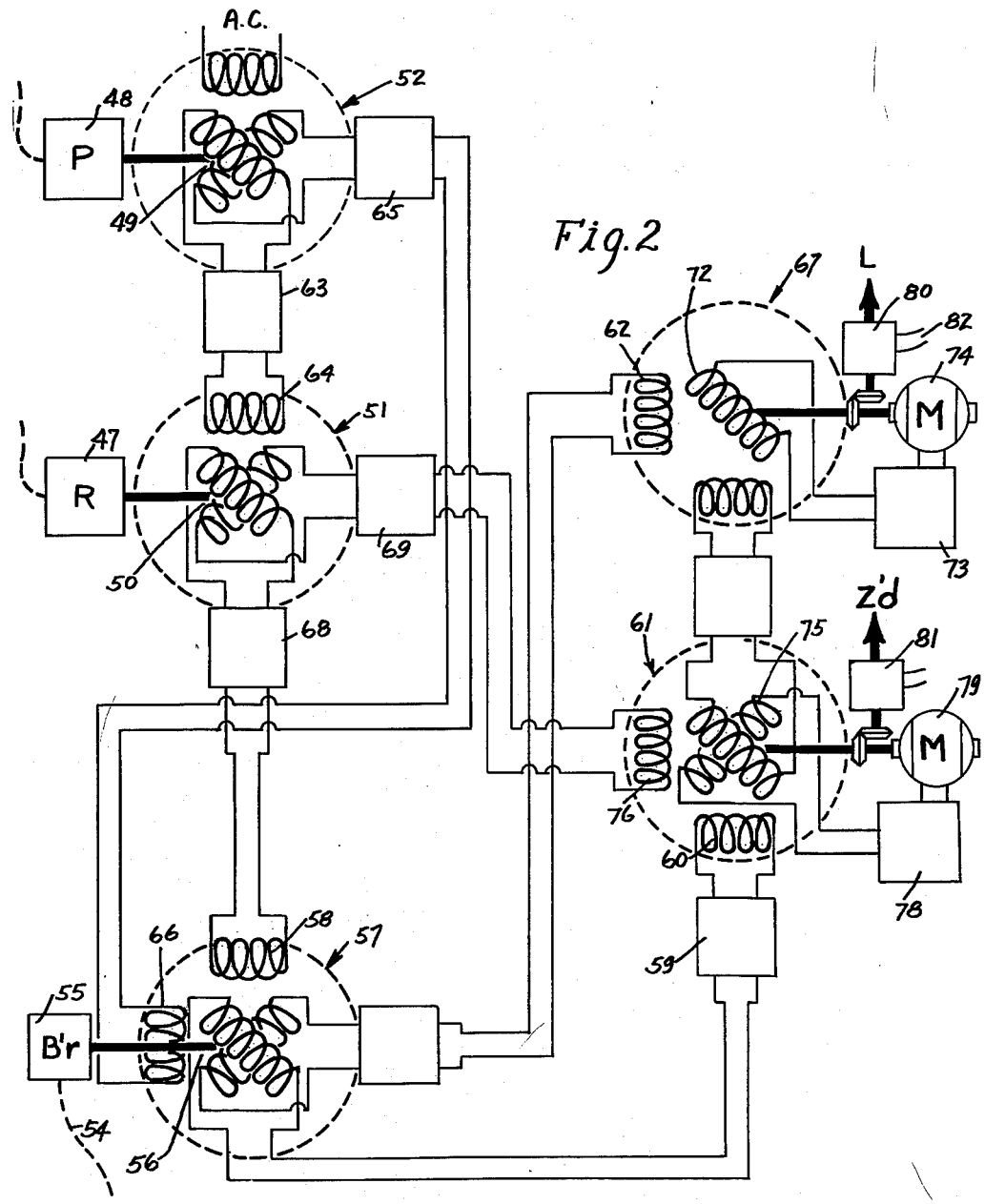

2,989,672
GYROSCOPE STABILIZING MECHANISM
George Agins, Brooklyn, N.Y., assignor to American Bosch Arma Corporation
Filed June 20, 1945, Ser. No. 600,605
12 Claims. (Cl. 318—19)

This invention relates to stabilizing mechanism and has particular reference to a gimbal system for a stable element used to measure the angular motions of an unstable support such as a ship, aircraft or "tank."

One important use of such gimbal systems is in firing guns from unstable craft, and inasmuch as the firing problem is very largely related to the earth, it is essential that the unpredictable angular movements of the unstable mount relative to the earth be accurately known. These angular movements are usually continuously measured with relation to a stable base related to the earth, such as a gyroscope, and usually in two mutually perpendicular planes defined by gimbals.

Before the advent of the airplane as a common implement of war, the measurement of the angular motion of a ship's deck, for instance, was divided into two planes suitable to a surface-firing gun or range finder, one in the plane of elevation of the range finder and the other perpendicular thereto, since the other units on the ship usually had gimbals mounted in the same way. In that case the gimbal which measured pitch angle had its axis fixed parallel to the deck and the gimbal which measured roll angle had its axis upon the pitch gimbal at right angles to the pitch axis.

Anti-aircraft gun fire control introduced additional and different requirements. For example, in order to avoid excess corrections in train due to high elevation angles, the range finder must be completely stabilized and for structural reasons the crosswise swing must be on an axis parallel to the deck. The level or elevation axis, accordingly is that of the cross-leveled range finder tube. In the gimbal system of the gyroscope follow-up system for such a range finder, the outer or cross-level gimbal is pivoted on an axis parallel to the deck and in the vertical plane of the target and the inner or level gimbal is mounted upon it on an axis at right angles to the target direction and in a horizontal plane. However, as this system must be adapted to the requirements peculiar to the corresponding range finder or other instrument, a separate stable gimbal system is provided for each instrument, thus necessitating considerable duplication of the same fundamental system throughout a battle ship, for example.

In accordance with the present invention, a stable gimbal system is provided whose analysis of the angular movements of the ship or other unstable support is permanently related to the deck or other part of the support to which each range finder or other instrument is in turn related through a suitable conversion mechanism, so that a single stable gimbal system may serve any number of instruments dispersed at different and widely separated positions on the ship or other support, thus greatly simplifying multiple gun fire control systems and the like. The aforementioned permanent relation between the stable gimbal system and the ship upon which the stabilizing calculations of each of the observation, gun fire control, or other instruments are based, is obtained by pivoting the gimbals on a plane permanently parallel to the deck or other fixed part of the unstable support, with the pivots preferably located in mutually perpendicular fore-and-aft and athwartships planes normal to the deck plane, so that true pitch and roll angular movements are independently analyzed and errors due to rotation and correction therefor are avoided. The pitch and roll movements are then converted into trigonometric values related to the locus of the receiving instrument, such as anti-aircraft range finder, by an electrical induction calculating mechanism, and are delivered to the range finder in the desired form for use thereby.

For a more complete understanding of the invention, reference may be had to the accompanying drawings, in which:

FIGURE 1 is a schematic illustration of the stabilizing mechanism of this invention as applied to an anti-aircraft range finder;

FIG. 2 is a schematic diagram of one form of angle conversion mechanism that may be used with the stabilizing mechanism, and FIG. 3 is a simplified plan view of the roll and pitch detecting means of the stabilizing mechanism.

For purposes of illustration, a more or less standard anti-aircraft range finder will be described in operative association with the stabilizing mechanism of this invention. Such range finder usually includes a rotary platform 10 mounted for target bearing rotation about an axis 11 perpendicular to the deck of the ship. Stanchions 12 mounted on platform 10 carry bearings 13 in which is journalled the parallel shaft 14 carrying the frame 15 having ring bearings 16 in which the range finder 17 is rotatable about its normally horizontal axis by means of handcrank 19. The range finder 17 is thus movable both in a plane perpendicular to the deck and shaft 14 and about its long axis, so as to follow a target in elevation. A handcrank 18 is geared to platform 10 for training the range finder 17 about vertical platform axis 11.

Unless stabilized against the angular movements of the ship, the image of an aerial target brought into the field of view by training and elevating the range finder 17 when the ship is on even keel will be lost to view immediately if the ship heels over. In order to prevent such effects, corrections are commonly provided by a stable element, such as a gyroscope, not shown, but mounted on a platform pivoted about a perpendicular axis and geared to platform 10 through an idler gear so that the gimbal axes of the gyroscope remain in the same angular relation to the shaft 14 and the longitudinal axis of the range finder 17 at all train angles. As the gyroscope gimbals move relatively to the gyroscope in coordinate planes, the respective level and cross-level angles are transmitted electrically by follow-up mechanism to level motor 20 for rotating the range finder 17 through gearing 21 about its longitudinal axis, and to cross-level motor 22 for rotating shaft 14 through gearing 23. In this way the range finder 17 is commonly stabilized to keep the target in the field of view, and each range finder or other instrument requiring stabilization is provided with its own stabilizing mechanism located immediately adjacent thereto so as to partake of and thus accurately detect the same angular movements that it undergoes. Obviously, where a great many observation and calculating instruments are required, such as the gun fire control instruments distributed throughout a battleship, much duplication and hence cost, weight and space expenditure results.

A single common stabilizing mechanism, used in conjunction with a simple angle transforming mechanism, which replaces all of the individual stable elements in accordance with this invention, includes a long period stable element 25, such as the vertical axis gyroscope shown, although any long period pendulum may be employed with equal facility. The gyroscope is preferably suspended for universal movement in a Cardan mounting supported on the deck 27.

Mounted on the top end of the casing of the gyroscope 25 and coaxially with the spin axis thereof is an electromagnet 26 energized from a source of alternating current, not shown, so that it is surrounded by a rapidly alternating magnetic field. Positioned above electromagnet 26, within its magnetic field, are two independent double coils 28 and 29 arranged normally horizontally with their axes crossed at right angles, as is shown particularly in FIG. 3, which illustrates in plan the neutral inductive condition, where longitudinal axis of the electromagnet 26 coincides with the aligned axes of the coils 28 and 29, so that no output voltage appears across leads 36 or across leads 39. Each half of each double coil is wound oppositely to the other half, so that current induced in one half flows in the opposite direction to that induced in the other half. One form of such induction mechanism is disclosed in Patent No. 2,410,638, to which reference may be had for further details of construction and operation. Double coil 28 is carried by a bail 30 pivoted in deck bearings 31 mounted on stanchions 32 permanently fixed to the deck 27 in a plane perpendicular thereto and including the axis of gyroscope 25.

Double coil 29 is similarly carried by independent bail 33 pivoted in deck-bearings 34 mounted on stanchions 35 permanently fixed to the deck 27 in a plane perpendicular thereto and preferably normal to the plane of stanchions 32 and including the axis of gyroscope 25. Thus, each bail is movable independently of the other about respective mutually perpendicular axes which are fixedly oriented in a plane parallel to the deck 27. Although two such bails are shown, preferably arranged in fore-and-aft and athwartships planes, more may be employed if desired, arranged at any angle to each other and to the fore-and-aft axis of the ship.

It will be observed that when the deck 27 is horizontal and bails 30 and 33 lie in mutually perpendicular vertical planes, the intersection of the axes of double coils 28 and 29 lies on the axis of electromagnet 26. Relative misalignment of the axis of the coil 28 or 29 with the axial plane of electromagnet 26 causes a voltage to be induced in the half of the coil that lies immediately above the electromagnet 26 and the current flows in a direction opposite to that in the other half of the coil when the electromagnet lies opposite thereto.

The two halves of double coil 28 are connected by cable 36 to a conventional electronic amplifier 37 which amplifies the voltage fluctuations induced in either half of coil 28 and feeds them to motor 38, causing rotation in the proper direction to restore bail 30, through gearing 38', to vertical position, which likewise restores alignment between the axis of double coil 28 and the axis of electromagnet 26, whereupon voltage is no longer induced in coil 28 and motor 38 is deenergized.

Similarly, the two halves of double coil 29 are connected by cable 39 to electronic amplifier 40 for feeding amplified voltage induced in either half of coil 29 to motor 41, which rotates in the proper direction, to swing bail 33 through gearing 41' so as to restore alignment between double coil 29 and electromagnet 26 and thus deenergize itself.

Motors 38 and 41 drive self-synchronous transmitters 42 and 43 connected by cables 44 and 45, respectively, to corresponding receivers for reproducing the movements of corresponding bails 30 and 33 at remote points for gun fire calculations or the like. Preferably, the deck angles measured by bails 30 and 33 and transmitted by respective transmitters 42 and 43 are transformed or converted at 46 into angles to conform to those required by such standard instruments as the range finder 17 shown in FIG. 1, notwithstanding that the coordinate bails 30 and 33 do not bear a constant relation to the coordinate axes of the shaft 14 and the long axis of range finder 17. The mechanisms of bails 30 and 33 accordingly supply common values characteristic of the angular movement of the deck 27 to any number of angle transformers or converters 46 adapted to the characteristic of corresponding instruments of various functions.

Assuming for purposes of illustration that stanchions 32 carrying bail 30 are arranged in the fore-and-aft or keel plane, so that receiver 47 of transmitter 42 reproduces roll angles as measured by bail 30, and that stanchions 35 lie athwartships so that receiver 48 of transmitter 43 reproduces pitch angles as measured by bail 33, these receivers 47 and 48 position the rotors 50 and 49 of induction resolvers 51 and 52, respectively, as shown in FIG. 2. Similarly, range finder bearing is transmitted by transmitter 53, actuated by handcrank 18, by cable 54 to receiver 55 for positioning the rotor 56 of induction resolver 57. In each of these induction resolvers one or more coils rotate relatively to one or more stationary coils and, when either one or more stationary coils or one or more rotating coils is energized, a voltage is induced in the other whose magnitude depends jointly upon the angular relation between them and the input voltage or voltages. The voltage resulting from mutual induction corresponds to a trigonometric function of the angle and the input voltage or voltages.

The voltage induced in one winding of the rotor 49 of pitch resolver 52 in accordance with the angle through which it has been rotated by pitch receiver 48, is reinforced by booster amplifier 63 and impressed on the stator coil 64 of roll resolver 51, whereas the voltage induced in the other rotor coil is reinforced by a suitable electronic booster 65 and impressed on the stator winding 66 of bearing resolver 57.

The rotor 50 of resolver 51, being rotated through the roll angle, results in the induction of voltages in its rotor windings, one of which is reinforced by booster 68 and impressed on the second stator winding 58 of bearing resolver 57, whereas the voltage from the other rotor coil of roll resolver 51 is reinformed by booster amplifier 69 and impressed on one winding 76 of cross-level resolver 61.

The stator coil 58 of resolver 57 is energized from booster 68 of resolver 51 and in conjunction with the energization of stator coil 66, induces in the coils of rotor 56 voltages which are equal to trigonometric functions of the bearing angle through which rotor 56 has been rotated by receiver 55. The cosine voltage is reinforced at 59 by a suitable electronic booster and impressed on the stator coil 60 of cross-level resolver 61 and the sine voltage is applied by booster amplifier 85 and impressed on the stator coil 62 of level resolver 67.

The rotor of level output resolver 67 is provided with a null winding 72 in which no voltage is induced when it is positioned at the proper angle, i.e., when the level output angle conforms to that necessary to keep the range finder 17 at the proper angle to maintain its adjustment on the target. As the ship is pitching virtually continuously, level angle likewise continues to change. Accordingly, any voltage induced in null coil 72 is amplified at 73 and impressed on level motor 74 to cause the same to rotate until null coil 72 is turned to the angle at which voltage is no longer induced therein, whereupon motor 74 is deenergized.

Similarly, the rotor coil 75 of cross-level output resolver 61 is a null coil responding to the joint field of stator coil 60 and stator coil 76 energized by voltage supplied through booster 69 from the other rotor coil of roll resolver 51. The voltage induced in null coil 75 is amplified at 78 and impressed on cross-level motor 79 which rotates null coil 75 to its non-inductive angle which is the cross-level angle and thus motor 79 is deenergized. The voltage induced in rotor winding 87 of resolver 61, is amplified by booster amplifier 86, and then applied to stator winding 84 of resolver 67.

Level motor 74 may be the same as motor 20 of FIG. 1 for stabilizing the range finder 17 about its long axis, and cross-level motor 79 may be the same as motor 22 for bodily rotating range finder 17 about the axis of shaft 14 for purposes described, but as transformation mechanism 46 is usually remote from the range finder or other instrument, motors 74 and 79 preferably drive respective transmitters 80 and 81 connected by cables 82 and 83 to corresponding level and cross-level receivers of conventional construction (not shown) to control motors 20 and 22.

In this way the range finder 17 is maintained stabilized at all times regardless of the orientation of the range finder on its platform relatively to the bails 30 and 33. As stated, the single common stabilizing element and follow-up, 24 to 45, may be used to stabilize a plurality of remote, independently oriented instruments, and to illustrate this feature, the range finder, 10 to 23, is identified on FIG. 1 as "Instrument No. 1" and a second parallel-connected remote "Instrument No. 2" is shown with its transformation mechanism 46′ connected to the stable element by respective roll and pitch angle transmission cables 44′ and 45′ and to its corresponding "Instrument No. 2" by cables 54′, 82′ and 83′, these cables corresponding to cables 44, 45, 54, 82 and 83, respectively.

Operation of the stabilizing mechanism of this invention is apparent from the foregoing description, and is based upon the independent and individual motion of each bail 30 and 33 relatively to the deck 27 to which their respective angular relations in the deck plane are permanently fixed. Although the orientation of the several remote instruments such as range finder 17, changes virtually continuously in operation relatively to the bails 30 and 33, the changing relation between the two mechanisms is compensated by the angle transforming mechanism 46, which maintains constant the relation between corresponding angles regardless of the difference between and change in their relative magnitudes.

The theory of the transformation mechanism 46 is based on the following three coordinate transformation equations from spherical trigonometry:

$$\cos L \cos Z'd = \cos R \cos P \quad (1)$$
$$\cos L \sin Z'd = \sin R \cos P \cos B'r + \sin P \sin B'r \quad (2)$$
$$\sin L = \sin P \cos B'r - \sin R \cos P \sin B'r \quad (3)$$

In operation of the transformation mechanism 46, the two output voltages of resolver 52 are proportional, respectively, to sin P, and cos P, and the cos P voltage is applied to the stator winding 64 of resolver 51, while the sin P voltage is applied to the stator winding 66 of resolver 57. The two resulting output voltages of resolver 51 are proportional respectively to sin $R$ cos $P$, and cos $R$ cos $P$. The sin $R$ cos $P$ voltage is applied to stator winding 58 of resolver 57, while the cos $R$ cos $P$ voltage is applied to stator winding 76 of resolver 61. The two resulting output voltages of resolver 57 are proportional respectively to sin $R$ cos $P$ cos $B'r$+sin $P$ sin $B'r$, and to sin $P$ cos $B'r$−sin $R$ sin $P$ sin $B'r$. The sin $R$ cos $P$ cos $B'r$+sin $P$ sin $B'r$ voltage is applied to stator winding 60 of resolver 61, while the sin $P$ cos $B'r$−sin $R$ cos $P$ sin $B'r$ voltage is applied to stator winding 62 of resolver 67.

Referring now to Equation 1, the cos $R$ cos $P$ voltage applied to stator winding 76 of resolver 61, is equal to cos $L$ cos $Z'd$, and with reference to Equation 2, the sin $R$ cos $P$ cos $B'r$+sin $P$ sin $B'r$ voltage applied to stator winding 60 of resolver 61 is equal to cos $L$ sin $Z'd$. Resolver 61 composes the two input voltages of cos $L$ cos $Z'd$, and cos $L$ sin $Z'd$, into the resultant voltage proportional to cos $L$, and simultaneously solves the angle $Z'd$. The cos $L$ voltage is applied to the stator winding 84 of resolver 67. With reference to Equation 3, the sin $P$ cos $B'r$−sin $R$ cos $P$ sin $B'r$ voltage applied to stator winding 62 of resolver 67, is equal to sin $L$. Resolver 67 solves the angle L from the two input voltages of sin L and cos L.

It will be understood that while each observation instrument is provided with its own transformation mechanism 46 which responds to and compensates for the differences between it and the measuring bails 30 and 33, such mechanisms are far simpler and more compact than the individual stabilizing elements now in use, and any further details regarding theory of operation or application thereof to different angle transformation problems may be had upon reference to copending application Serial No. 620,595, filed October 5, 1945 by E. D. Gittens, now Patent No. 2,463,687.

Although a preferred embodiment of the invention has been illustrated and described herein, it is to be understood that the invention is not limited thereto, but is susceptible of changes in form and detail within the scope of the appended claims.

I claim:

1. In a stabilizing mechanism for a remote instrument mounted on an unstable support, said instrument being supported for variable orientation and for adjustment relatively to said support for compensating for the unstable movements of the latter, the combination of a stable element mounted for angular movement relatively to said support as the latter moves, a pair of members swingably mounted on pivots fixed on said support and fixedly oriented with respect thereto for mutually independent angular pivotal movement with said support in several planes from a predetermined position relatively to said stable element, electrical means responsive to relative movement of each of said members from said predetermined position, follow-up means energized by said electrical means for restoring the corresponding member angularly about its pivots to said predetermined position independently of the other member, mechanism actuated in accordance with said restoring movements of said members for transforming the angles of movement thereof relative to said stable element into equivalent angles of movement relatively to said unstable support corresponding to orientation of said instrument relatively to the fixed orientation of said member for compensating for the unstable movement of said instrument, and motive means operatively connected to said instrument and actuated by said mechanism for driving said instrument through said equivalent angles to stabilize the same.

2. In a stabilizing mechanism for a remote instrument mounted on an unstable support, said instrument being supported for variable orientation and for adjustment relatively to said support for compensating for the unstable movements of the latter, the combination of a stable element mounted for angular movement relatively to said support as the latter moves, a plurality of bails mounted on pivots fixed on said support and fixedly oriented with respect thereto for mutually independent angular pivotal movement with said support in several planes from a predetermined position relatively to said stable element, electrical means responsive to relative movement of each of said bails from said predetermined position, follow-up means energized by said electrical means for restoring said bails angularly about their pivots to said predetermined position independently of each other, mechanism actuated in accordance with said restoring movements of said bails for transforming the angles of movement thereof relative to said stable element into equivalent angles of movement relatively to said unstable support corresponding to orientation of said instrument relatively to the fixed orientations of said bails for compensating for the unstable movement of said instrument, and motive means operatively connected to said instrument and actuated by said mechanism for driving said instrument through said equivalent angles to stabilize the same.

3. In a stabilizing mechanism for a remote instrument mounted on an unstable support, said instrument being supported for variable orientation and for adjustment relatively to said support for compensating for the unstable movement of the latter, the combination of a stable element mounted for angular movement relatively to said support as the latter moves, a plurality of bails mounted about normally horizontal axes on pivots fixed on said support and fixedly oriented with respect thereto for mutually independent angular pivotal movement with said support in several planes from a predetermined position relatively to said stable element, electrical means responsive to relative movement of each of said bails from said predetermined position, follow-up means energized by said electrical means for restoring said bails angularly about their pivots to said predetermined position independently of each other, mechanism actuated in accordance with said restoring movements of said bails for transforming the angles of movement thereof relative to said stable element into equivalent angles of movement relatively to said unstable support corresponding to orientation of said instrument relatively to the fixed orientations of said bail for compensating for the unstable movement of said instrument, and motive means operatively connected to said instrument and actuated by said mechanism for driving said instrument through said equivalent angles to stabilize the same.

4. In a stabilizing mechanism for a remote instrument mounted on an unstable support, said instrument being supported for variable orientation and for adjustment relatively to said support for compensating for the unstable movements of the latter, the combination of a stable element mounted for angular movement relatively to said support as the latter moves, a plurality of bails mounted about normally horizontal axes arranged at an angle on pivots fixed on said support and fixedly oriented with respect thereto for mutually independent angular pivotal movement with said support in several substantially vertical planes from a predetermined position relatively to said stable element, electrical means responsive to relative movement of each of said bails from said predetermined position, follow-up means energized by said electrical means for restoring said bails angularly about their pivots to said predetermined position independently of each other, mechanism actuated in accordance with said restoring movements of said bails for transforming the angles of movement thereof relative to said stable element into equivalent angles of movement relatively to said unstable support corresponding to orientation of said instrument relatively to the fixed orientations of said bail for compensating for the unstable movement of said instrument, and motive means operatively connected to said instrument and actuated by said mechanism for driving said instrument through said equivalent angles to stabilize the same.

5. In a stabilizing mechanism for a remote instrument mounted on an unstable support, said instrument being supported for variable orientation and for adjustment relatively to said support for compensating for the unstable movements of the latter, the combination of a stable element mounted for angular movement relatively to said support as the latter moves, a plurality of bails mounted about normally horizontal axes arranged at right angles to each other on pivots fixed on said support and fixedly oriented with respect thereto for mutually independent angular pivotal movement with said support in several substantially vertical planes from a predetermined position relatively to said stable element, electrical means responsive to relative movement of each of said bails from said predetermined position, follow-up means energized by said electrical means for restoring said bails angularly about their pivots to said predetermined position independently of each other, mechanism actuated in accordance with said restoring movements of said bails for transforming the angles of movement thereof relative to said stable element into equivalent angles of movement relatively to said unstable support corresponding to orientation of said instrument relatively to the fixed orientations of said bail for compensating for the unstable movement of said instrument, and motive means operatively connected to said instrument and actuated by said mechanism for driving said instrument through said equivalent angles to stabilize the same.

6. In a stabilizing mechanism for a remote instrument mounted on an unstable support, said instrument being supported for variable orientation and for adjustment relatively to said support for compensating for the unstable movements of the latter, the combination of a stable element mounted for angular movement relatively to said support as the latter moves, a plurality of bails mounted about normally horizontal axes on pivots fixed on said support at opposite sides of said element and fixedly oriented with respect thereto for mutually independent angular pivotal movement with said support in several substantially vertical planes from a predetermined registering position relatively to said stable element, electrical means responsive to relative movement of each of said bails from said predetermined position, follow-up means energized by said electrical means for restoring said bails angularly about their pivots to said predetermined position independently of each other, mechanism actuated in accordance with said restoring movements of said bails for transforming the angles of movement thereof relative to said stable element into equivalent angles of movement relatively to said unstable support corresponding to orientation of said instrument relatively to the fixed orientations of said bails for compensating for the unstable movement of said instrument, and motive means operatively connected to said instrument and actuated by said mechanism for driving said instrument through said equivalent angles to stabilize the same.

7. In a stabilizing mechanism for a remote instrument mounted on an unstable support, said instrument being supported for adjustment relatively to said support for compensating for the unstable movements of the latter, the combination of a stable element mounted for angular movement relatively to said support as the latter moves, a plurality of bails mounted about normally horizontal axes on pivots fixed on said support at opposite sides of said element and fixedly oriented with respect to said support for mutually independent angular pivotal movement with said support in several substantially vertical planes from a predetermined registering position relatively to said stable element, electrical means jointly carried by said bails and element in normal registry responsive to relative movement of each of said bails froms said predetermined position, follow-up means energized by said electrical means for restoring said bails angularly about their pivots to said predetermined position independently of each other, mechanism actuated in accordance with said restoring movements of said bails for transforming the angles of movement thereof relative to said stable element into equivalent angles of movement relatively to said unstable support corresponding to orientation of said instrument relatively to the fixed orientations of said bails for compensating for the unstable movement of said instrument, and motive means operatively connected to said instrument and actuated by said mechanism for driving said instrument through said equivalent angles to stabilize the same.

8. In a stabilizing mechanism for a remote instrument mounted on an unstable support, said instrument being supported for adjustment relatively to said support for compensating for the unstable movements of the latter, the combination of a stable element mounted for angular movement relatively to said support as the latter moves, a plurality of bails mounted about mutually perpendicular axes on pivots fixed on said support at opposite sides of said element and fixedly oriented with respect to said support for mutually independent angular pivotal movement with said support in several planes across the vertical axes of said stable element from a predetermined position relatively to said stable element, electrical means oppositely carried by said bails and element and inductively responsive to relative movement of each of said bails from said predetermined position, follow-up means energized by the voltage induced by said electrical means for restoring said bails angularly about their pivots to said predetermined position independently of each other, mechanism actuated in accordance with said restoring movements of said bails for transforming the angles of movement thereof relative to said stable element into equivalent angles of movement relatively to said unstable support corresponding to orientation of said instrument relatively to the fixed orientations of said bails for compensating for the unstable movement of said instrument, and motive means operatively connected to said instrument and actuated by said mechanism for driving said instrument through said equivalent angles to stabilize the same.

9. In a stabilizing mechanism for a plurality of remote instruments mounted on an unstable deck for mutually independent orientation thereon, the combination of a vertical axis gyroscope, a gimbal suspension therefor mounted on said deck, a pair of bails pivoted about mutually perpendicular axes fixedly mounted in a plane parallel to said deck and fixedly oriented with respect thereto and normally lying in the plane on said gyroscope axis, an electromagnet mounted on said gyroscope, an induction coil mounted on each bail, follow-up mechanism responsive to voltage induced in said respective coils upon relative movement between the corresponding bail and said electromagnet of said axis plane, operative connections between said mechanism and each bail for restoring the latter to said axis plane independently of the other bail, transmission means between said follow-up mechanism and each remote instrument for stabilizing the latter, and means interposed in each transmission means for modifying the stabilization of the corresponding remote instrument to compensate for the difference between the responses of each bail and said instrument to the unstable movements of said deck due to the difference between the orientation of each said corresponding remote instrument and said bail.

10. In a stabilizing mechanism for a plurality of remote instruments mounted on an unstable support for mutually independent orientation thereon, the combination of a vertical axis gyroscope, a gimbal suspension therefor mounted on said support, a plurality of bails each pivoted about an axis on said support and fixedly oriented with respect thereto and normally lying in the plane of said gyroscope axis, an electromagnet mounted on said gyroscope, an induction coil mounted on each said bail, follow-up mechanism responsive to voltage induced in said respective coils upon relative movement between the corresponding bail and said electromagnet of said plane, operative connections between said mechanism and each said bail for restoring the latter to said plane independently of the other bail, transmission means between said follow-up mechanism and each remote instrument for stabilizing the latter, and means interposed in each transmission means for modifying the stabilization of the corresponding remote instrument to compensate for the difference between the responses of each bail and said corresponding instrument to the unstable movements of said support due to the difference between the orientation of each said corresponding remote instrument and said bail.

11. In a stabilizing mechanism for a plurality of remote instruments mounted on an unstable deck for mutually independent orientation thereon, the combination of a common stable element therefor including a gyroscope universally mounted on said deck, electrical follow-up mechanism fixedly oriented on said support and including members pivoted about axes fixedly mounted in a plane parallel to said deck and independently movable about said axes in response to the relative movements between said stable element and said deck, transmission means between said follow-up mechanism and each of said remote instruments for stabilizing the latter, and mechanism interposed in each transmission means and actuated jointly by said follow-up mechanism and the orientation of the corresponding remote instrument for modifying the stabilizing movements transmitted to said instrument in accordance with difference in orientation between the said instrument and said follow-up mechanism.

12. In a stabilizing mechanism for a plurality of remote instruments mounted on an unstable support for mutually independent orientation thereon, the combination of a common stable element therefor including a gyroscope universally mounted on said support, electrical follow-up mechanism fixedly oriented on said support and responsive to the relative movements between said stable element and said support, electrical transmission means between said follow-up mechanism and each of said remote instruments for stabilizing the latter, and mechanism interposed in each transmission means and including transformers having relatively movable windings actuated jointly by said follow-up mechanism and the orientation of the corresponding remote instrument for modifying the stabilizing movements transmitted to said instrument in accordance with difference in orientation between the said instrument and said follow-up mechanism.

References Cited in the file of this patent

UNITED STATES PATENTS

| 1,679,354 | Fairchild et al. | Aug. 7, 1928 |
| 2,069,417 | Murtagh et al. | Feb. 2, 1937 |
| 2,339,508 | Newell | Jan. 18, 1944 |
| 2,433,837 | Dawson | Jan. 6, 1948 |